United States Patent [19]

Messacar

[11] 4,006,551
[45] Feb. 8, 1977

[54] ARTIFICIAL BAITS
[76] Inventor: Howard E. Messacar, 696 Durie St., Toronto, Ontario, Canada, M6S 3H3
[22] Filed: July 16, 1975
[21] Appl. No.: 596,420
[52] U.S. Cl. .............................. 43/42.04; 43/42.28; 43/42.22
[51] Int. Cl.² ...................................... A01K 85/00
[58] Field of Search ........... 43/42.22, 42.28, 42.04, 43/42.39, 42.44

[56] References Cited
UNITED STATES PATENTS

| | | | |
|---|---|---|---|
| 1,272,812 | 7/1918 | Keister | 43/42.44 |
| 2,246,757 | 6/1941 | Rosegard | 43/42.04 |
| 2,556,205 | 6/1951 | McRoberts | 43/42.04 |
| 2,558,397 | 6/1951 | Toner, Jr. | 43/42.22 |
| 2,559,169 | 7/1951 | Pemberton | 43/42.44 |
| 2,748,520 | 6/1956 | Anderson | 43/42.39 |
| 3,006,100 | 10/1961 | Zeman | 43/42.04 |
| 3,863,378 | 2/1975 | Walker | 43/42.28 |

Primary Examiner—Warner H. Camp
Attorney, Agent, or Firm—Sim & McBurney

[57] ABSTRACT

This invention provides an artificial bait in which a plate member having an aperture secured to the underside of the body. The body has a recess registering with the aperture, and a wire member trapped between the plate and the body has a free end curving into the aperture and then extending upwardly into the recess to terminate in space relationship thereto. The hook with an eye at one end is adapted to be inserted through the aperture and into engagement with the free end of the wire member, such that the hook may readily be replaced by the angler.

4 Claims, 6 Drawing Figures

U.S. Patent    Feb. 8, 1977    4,006,551

SECTION 2-2

SECTION 2-2

SECTION 4-4

ARTIFICIAL BAITS

This invention relates to artificial baits or lures and it is an object thereof to provide a lure in which the hook may be easily and quickly attached or detached by the angler without the aid of tools.

Figure 1:
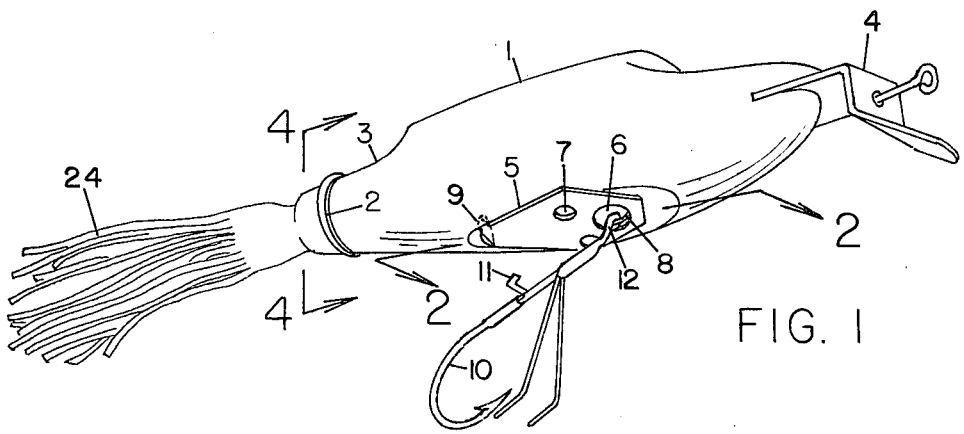
Figure 2:
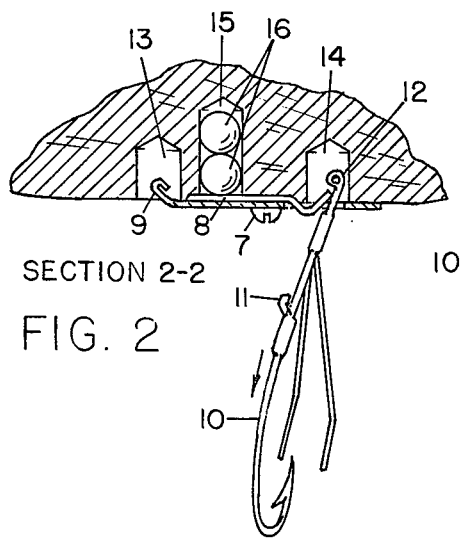
Figure 3:
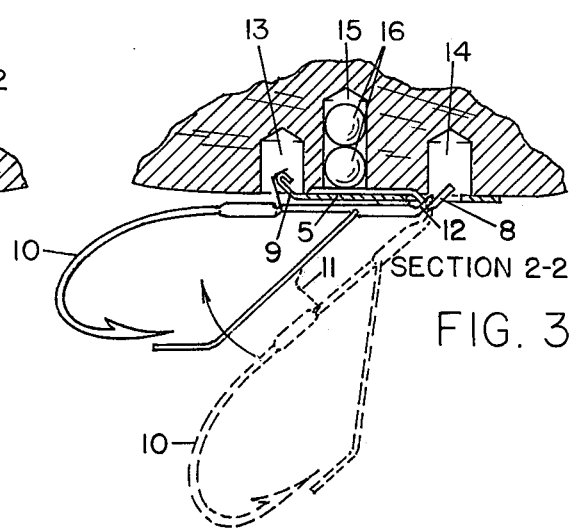
Figure 4:
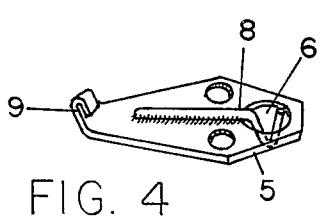
Figure 5:
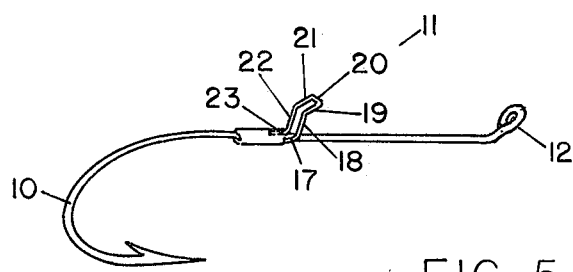

Other objects I have in mind will appear from the hereinafter detailed description of the invention, which is illustrated in the accompanying drawing in which FIG. 1 is a perspective view of my bait or lure;

FIG. 2 a partial cross sectional view on the line 2—2 of the lure together with a perspective view of the hook;

FIG. 3 a partial cross sectional view on the line 2—2 of the lure together with a plan view of the hook;

FIG. 4 a perspective view of the plate member;

FIG. 5 a perspective view of the finger which is attached to the hook; and

Figure 6:
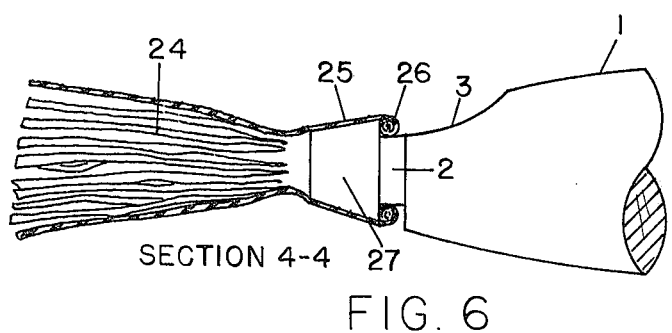

FIG. 6 a sectional plan view of the tail or rearward portion of my lure in the area of line 4—4.

The body 1 of the lure is shaped to resemble a small fish. The body 1 is preferably circular in cross section and tapered towards both the front and rear ends. At the forward end of body 1 is carried a plate 4 which may extend downwardly and forwardly. The body 1 is made preferably of rigid material and is grooved 2 and recessed 3.

A plate 5, which may be made of metal, is fastened securely to the body 1, preferably by screws. A hole 6 is located toward the forward end of plate 5. The rear of plate 5 is bent upwardly, forwardly, and downwardly at 9 to provide a receiver for the finger 11 on hook 10. Clearance 13 is made in body 1. A wire 8 is fastened to the top of plate 5 by solder or any method to positively secure it. Wire 8, toward its forward end, is bent first downwardly thru hole 6 in plate 5 and is then bent upwardly, again thru hole 6, with the end of the wire extending into clearance 14 in the body. That portion of wire 8 where the second or upward bend takes place, protrudes thru the hole 6 sufficiently to enable the shank of the hook to lie parallel to bottom surface of plate 5 when the hook is fully engaged.

The eye 12 of the hook 10, which may be turned up, is inserted in the hole 6 and drawn over the wire 8, first downwardly and then rearwardly. On the hook 10, is suitably carried a finger 11, preferably of spring wire, adapted to releasably engage the rear of plate 5. Finger 11 comprises a portion 17, running forward parallel to the shank of the hook with upward 18, forward 19, transverse 20, rearward 21, downward 22, and rearward 23 bends, and is now parallel to the shank of the hook on opposite side. When eye 12 of the hook 10 is placed on wire 8, and the hook is drawn downwardly, rearwardly and then upwardly, finger 11 strikes angled section 9 of plate 5 and is directed upwardly and rearwardly by the contour of section 9 and will spring forward on reaching the end of plate 5 at 9, and thereby position and hold the hook sufficiently firm for the strike of a fish. On a strike, the hook will release from plate 5 at 9, thereby minimizing the possibility of the fish using the body of the lure to lever itself free. When the eye 12 of the hook is placed over the end of wire 8 and started downwardly, the angle of the shank of the hook in relation to the surface of plate 5 is governed by the diameter of hole 6. The greater the diameter of hole 6, the easier to disengage the hook from wire 8; while the smaller the diameter, the greater the difficulty. With the hole 6 of suitable size, it is virtually impossible for a fish to disengage the hook from wire 8. Interchangeability of hooks permits use of needle sharp hooks at all times. Hooks may be single, double, or treble and they may be weedless or not.

A hole 15 is suitably positioned on the underside of body 1; thereby permitting the placement or removal of suitable weights 16, which may be lead pellets. The depth of travel of the lure when drawn thru the water, is regulated by this placement or removal. Weights are positioned below the longitudinal axis of the lure to ensure that the latter will not twist sideways while being drawn thru the water. Plate 5 holds weights in position, and is removed and replaced by screws 7.

The tail 24 is formed preferably of soft flexible rubber composition, and may be of any length and of any density of material to meet the whim of the angler. Tail 24 has at its forward end, an opening or mouth with a lip 26 on it. The lip 26 is substantially greater in thickness than the balance of the material in the tail. The tail 24 may be drawn forward over the tapered portion 27 of the body 1, and the lip 26 will readily position itself in groove 2, preferably flush with body 1 contour. The lip 26, on the tail 24, may be held manually in groove 2 by the angler and by grasping the tail 24 to the rear of body 1 the tail 24 at 25 is easily stretched and thinned and will then grasp firmly the body 1 at 27. The lip 26, in itself, has very little ability to hold the tail on the body 1. The holding of the tail 24 on body 1 is almost totally dependent on the body portion 27 being adapted to enable the tail to be stretched and thinned over it, and the elasticity of the material in the tail 24 causing it to grasp very firmly the body at 27. When the lure is drawn thru the water, the tail 24 acts as a stabilizer in the same manner as the tail on a kite. The tail 24 may be released from the body by utilizing the recess 3, and rolling the lip 26 over the body portion 27. Tails in an endless variety of colours may be quickly exchanged to meet different visibility conditions of the water being fished or to meet the whim of the angler.

What I claim as my invention is:

1. An artificial bait comprising:
   a body portion;
   a plate member secured to an underside of said body portion, the plate member having an aperture therethrough; the body portion having a blind recess in registry with said aperture;
   a wire member having a free end extending upwardly into said recess and terminating in spaced relation to the end of the recess, the wire member being bent in a J-shape within said aperture and having its other end enclosed above the plate member,
   and a hook having an eye at one end for engagement over said free end through the aperture.

2. The invention claimed in claim 1, in which the hook has a snap finger adapted to catch around the rearward end of the plate member when the hook lies back along the body portion.

3. The invention claimed in claim 2, in which the rearward end of the plate portion narrows and curves upwardly into a further recess in said body portion, the said snap-finger having a hook portion on the end adapted to snap over said curved rearward end.

4. The invention claimed in claim 1, in which the wire member is metallurgically bonded to the upper surface of said plate member.

* * * * *